B. H. JEFFERS.
ATTACHMENT FOR FURNITURE LEGS.
APPLICATION FILED NOV. 17, 1919.
1,329,605.
Patented Feb. 3, 1920.
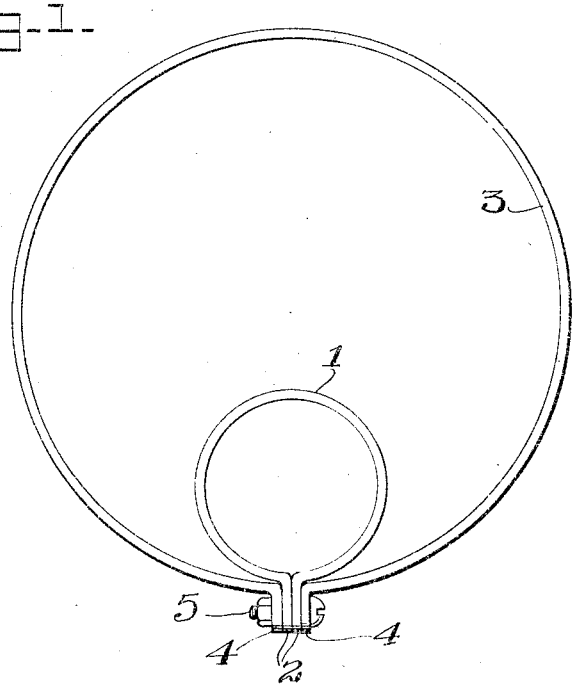
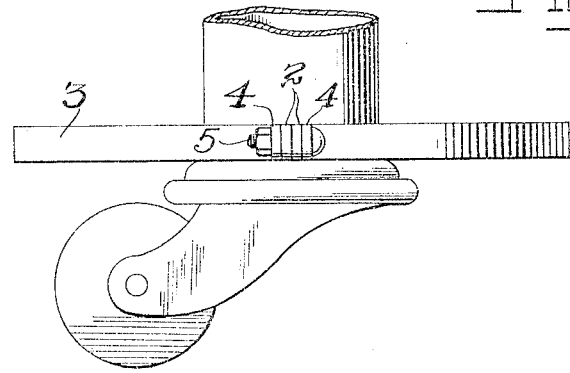
*INVENTOR.*
Bert H. Jeffers
BY
*ATTORNEYS.*

UNITED STATES PATENT OFFICE.

BERT H. JEFFERS, OF CHICAGO, ILLINOIS.

ATTACHMENT FOR FURNITURE-LEGS.

1,329,605.  Specification of Letters Patent.  Patented Feb. 3, 1920.

Application filed November 17, 1919. Serial No. 338,473.

*To all whom it may concern:*

Be it known that I, BERT H. JEFFERS, a citizen of the United States, residing at Chicago, in the county of Cook and State of Illinois, have invented new and useful Improvements in Attachments for Furniture-Legs, of which the following is a specification.

My invention relates to guards for furniture legs, and has for its principle to provide such a device having a projecting resilient ring adapted to contact against a wall, or the like, when the furniture is moved, thus to prevent the marring of the wall or the furniture.

With the object stated in view, my invention comprises the new and useful details of construction and arrangement, which will be hereinafter fully described, illustrated in the annexed drawing and claimed.

In the drawing:—

Figure 1 is a plan view of my assembled guard for furniture legs.

Fig. 2 is an elevation of my device shown applied to the leg of a bedstead.

My guard comprises a split clamp ring 1 adapted to encircle a furniture leg, said ring being preferably formed from a strip of light strap iron having the ends thereof bent outwardly to form ears 2. Arranged eccentrically of ring 1 is a split guard ring 3 formed of resilient material and also having outstanding ears 4 the guard ring 3 being of relatively larger diameter than the clamp ring 1. The ears 2 and 4 of rings 1 and 3 are perforated and a clamp bolt 5 is provided to unite the rings together, and clamp the ring 1 about the furniture leg in an obvious manner, the ears 2 seating between the ears 4.

In applying my device to a furniture leg, it is so positioned that the projecting resilient ring 3 is directed outward from the leg, the eccentric arrangement of the two rings thus allowing the guard ring to protrude a considerable distance. It will be readily seen that when the furniture to which my device is attached is moved toward an obstruction, or when other pieces of furniture are moved toward the leg to which my guard is applied, ring 3 will contact therewith, and thus prevent the marring of the legs, and said ring will also prevent marring of the wall of the room if the bedstead or other piece of furniture is moved closely thereto.

I claim:

1. A guard for furniture legs comprising a pair of resilient rings of different diameters eccentrically positioned one within the other and connected, the inner ring being adapted to encircle a furniture leg and having means for attachment thereto.

2. A guard for furniture legs comprising a split clamp ring adapted to encircle a furniture leg and having projecting perforated ears, a resilient guard ring arranged eccentrically of the clamp ring and having projecting perforated ears, between which the first mentioned ears seat, and a clamp bolt carried by the perforated ears of said rings for fastening the rings together and securing the clamp ring around the furniture leg.

In testimony whereof I affix my signature.

BERT H. JEFFERS.